Patented Oct. 5, 1943

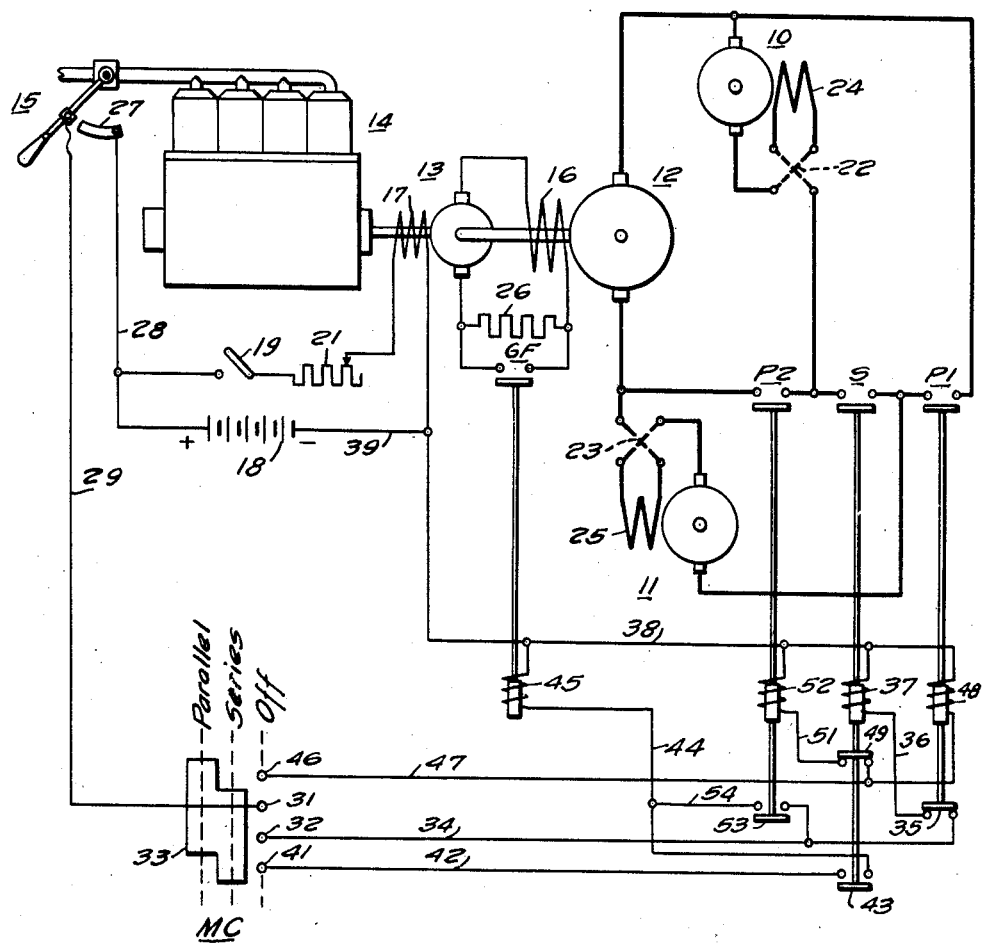

2,331,256

UNITED STATES PATENT OFFICE 2,331,256

CONTROL SYSTEM

Thelbert L. Weybrew, Edgewood, Pa., assignor to Westinghouse Electric & Manufacturing Company, East Pittsburgh, Pa., a corporation of Pennsylvania Application February 26, 1941, Serial No. 380,643

3 Claims. (Cl. 172—239)

My invention relates, generally, to control systems and, more particularly, to systems for controlling the operation of Diesel or gas-electric locomotives.

The traction motors of a Diesel-electric locomotive are supplied with electric energy by a separately excited generator driven by the Diesel engine. Excitation current for the generator is supplied by an exciter also driven by the engine. The exciter may be partially separately excited from a storage battery and partially self-excited. The separately excited field is continuously energized from the battery while the locomotive is in operation. Therefore, the exciter always develops a voltage which, if applied to the generator field winding at the same time that the traction motors are connected to the generator, results in a rapid start of the locomotive from standstill. Such rapid starts are considered desirable in normal switching service. However, when locomotives of this type are utilized in switching occupied Pullman cars, it is desirable to start more smoothly in order to avoid discomfort to the passengers. Furthermore, it is desirable that the control system be not unduly complicated in order to lower the initial cost of the equipment as well as the maintenance expense.

An object of my invention, generally stated, is to provide a control system for a Diesel-electric locomotive which shall be simple and efficient in operation and which may be economically manufactured and installed.

A more specific object of my invention is to provide for smooth operation of a Diesel-electric locomotive both during starting from standstill and during transition from series to parallel operation of the motors.

Other objects of my invention will be explained fully hereinafter or will be apparent to those skilled in the art.

In accordance with one embodiment of my invention, a resistor is provided in the circuit for the field winding of the main generator of a Diesel-electric locomotive and a switch is provided for shunting the resistor when it is desired to develop full voltage in the generator. The operation of this switch is so controlled by interlocks provided on the motor connecting switches that the shunting of the resistor is delayed until after the traction motors have started to develop tractive effort in proportion to the relatively low generator voltage. Likewise, the resistor shunting switch is opened to reduce the generator voltage during transition from series to parallel operation of the motors and its reclosing after transition is delayed by means of interlocks on the motor connecting switches.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises a pair of traction motors 10 and 11, a generator 12 for supplying current to the motors 10 and 11, an exciter 13 and an engine 14 for driving the generator 12 and the exciter 13. The engine 14 may be either a Diesel or a gas engine and is provided with a throttle 15 for controlling the supply of fuel to the engine. The generator 12 is provided with a field winding 16 which is energized by the exciter 13. As shown, the exciter 13 is provided with a field winding 17 which is energized by a battery 18 when a switch 19 is closed. If desired, the exciter 13 may also be provided with a self-excited field winding (not shown).

A variable resistor 21 is provided in the circuit for the field winding 17 to adjust the excitation current for the exciter 13. Reversing switches 22 and 23 are provided for reversing the current in the field windings 24 and 25 of the motors 10 and 11, respectively.

In accordance with the usual practice, a switch S is provided for connecting the motors across the generator 12 in series-circuit relation and switches P1 and P2 are provided for connecting the motors 10 and 11 in parallel-circuit relation. A controller MC, which may be of the drum type, is provided for controlling the operation of the switches S, P1 and P2.

In order to reduce the voltage developed by the generator 12 while the engine 14 is idling and also during the transition of the motors 10 and 11 from series to parallel operation, a resistor 26 is inserted in the circuit for the field winding 16 of the generator 12. A switch GF is provided for shunting the resistor 26 when full voltage of the generator 12 is desired. As explained hereinbefore, the operation of the switch GF is so controlled by interlocks provided on the switches S and P2 that the closing of the switch GF to shunt the resistor 26 from the field winding circuit is delayed until the motors have started to develop a tractive effort at the reduced voltage of the generator. The reclosing of the switch GF after the transition period is also delayed, as will be explained more fully hereinafter. In this manner, a smooth starting of the locomotive from standstill is provided and also a smooth transition from series to parallel operation, since the tractive effort and hence the locomotive movement builds up gradually.

In order that the functioning of the foregoing apparatus may be more clearly understood, the operation of the system will now be described in detail. Assuming that the engine 14 has been started in the usual manner, the locomotive may be put into operation by closing the switch 19 to energize the field winding 17. The controller MC is then actuated to the series position and the throttle 15 opened to increase the supply of fuel to the engine 14. It will be noted that the throttle 15 is provided with a switch 27 which is closed when the throttle is opened. The closing of the switch 27 establishes an energizing circuit for the actuating coil of the switch S which may be traced from the positive terminal of the battery 18 through conductor 28, the switch 27, conductor 29, contact fingers 31 and 32 bridged by a segment 33 on the controller MC, conductor 34, an interlock 35 on the switch P1, conductor 36, the actuating coil 37 of the switch S, conductors 38 and 39 to the negative terminal of the battery 18. The closing of the switch S connects the motors 10 and 11 across the generator 12 in series-circuit relation.

As explained hereinbefore, the closing of the switch GF to shunt the resistor 26 from the circuit for the field winding 16 of the generator 12 is delayed by means of an interlock on the switch S until after the switch S has closed, thereby causing the motors 10 and 11 to start at a reduced voltage of the generator 12. When the switch S closes, a circuit is established for the actuating coil of the switch GF which may be traced from a contact finger 41 on the controller MC through conductor 42, an interlock 43 on the switch S, conductor 44, the actuating coil 45 of the switch GF and conductors 38 and 39 to the battery 18. When the resistor 26 is shunted by the switch GF, the generator voltage increases gradually because of the large inductance of the generator field. In this way, the tractive effort of the motors builds up gradually.

The acceleration of the locomotive continues until the throttle 15 is wide open. A higher speed is obtained by moving the controller MC to the parallel position, thereby opening the switches GF and S and closing the switches P1 and P2 to connect the motors 10 and 11 in parallel-circuit relation. The energizing circuit for the actuating coil of the switch P1 may be traced from a contact finger 46 on the controller MC through conductor 47, the actuating coil 48 on the switch P1 and conductors 38 and 39 to the battery 18. The energizing circuit for the coil of the switch P2 extends from the conductor 47 through an interlock 49 on the switch S, conductor 51, the actuating coil 52 of switch P2 and conductors 38 and 39 to the battery 18.

It will be noted that the reclosing of the switch GF to shunt the resistor 26 from the circuit for the field winding 16 of the generator 12 cannot take place until after the switch P2 is closed. The energizing circuit for reclosing the switch GF extends from conductor 34 through an interlock 53 on the switch P2, conductors 54 and 44, the actuating coil 45 of the switch GF and conductors 38 and 39 to the battery 18. In this manner, full voltage of the generator 12 is not applied to the motors until after the completion of the transition from series to parallel operation, thereby ensuring smooth operation of the locomotive during the transition period.

From the foregoing description, it is apparent that I have obtained the advantage of smooth acceleration of a diesel or gas-electric locomotive in a relatively simple manner since the desired operation of the locomotive is obtained by means of interlocks actuated by the switches which are usually provided for establishing the desired motor connections. Therefore, the present system is simple in operation and may be provided on a locomotive by the addition of a small amount of equipment to the apparatus usually installed on diesel-electric locomotives.

Since numerous changes may be made in the above-described construction and different embodiments of the invention may be made without departing from the spirit and scope thereof, it is intended that all matters contained in the foregoing description or shown in the accompanying drawing shall be interpreted as illustrative and not in a limiting sense.

I claim as my invention:

1. In a motor control system, in combination, a pair of motors, a generator for supplying current to the motors, an engine for driving the generator, a plurality of switches individually operable in sequential relation for connecting the motors to the generator in either series or parallel-circuit relation, a controller for controlling the sequential operation of said switches, means for varying the excitation of the generator, and interlocking means actuated by said switches for controlling the operation of said excitation varying means.

2. In a motor control system, in combination, a pair of motors, a generator for supplying current to the motors, an engine for driving the generator, switching means for connecting the motors to the generator in series-circuit relation, additional switching means for connecting the motors to the generator in parallel-circuit relation, a controller for operating said switching means in sequential relation, interlocking means actuated by said switching means for preventing them from closing simultaneously, means for varying the excitation of the generator, and additional interlocking means actuated by said switching means for controlling the operation of said excitation varying means.

3. In a motor control system, in combination, a pair of motors, a generator for supplying current to the motors, an engine for driving the generator, switching means for connecting the motors to the generator in series-circuit relation, additional switching means for connecting the motors to the generator in parallel-circuit relation, a controller for operating said switching means in sequential relation, interlocking means actuated by said switching means for preventing them from closing simultaneously, a resistor for controlling the excitation of the generator, a switch for shunting said resistor, and additional interlocking means actuated by said switching means for controlling the operation of said switch.

THELBERT L. WEYBREW.